G. DIXON.
VALVE OPERATING GEAR FOR STEAM ENGINES.
APPLICATION FILED JULY 8, 1911.

1,009,652.

Patented Nov. 21, 1911

G. DIXON.
VALVE OPERATING GEAR FOR STEAM ENGINES.
APPLICATION FILED JULY 8, 1911.

1,009,652.

Patented Nov. 21, 1911.

UNITED STATES PATENT OFFICE.

GEORGE DIXON, OF BOLTON, ENGLAND.

VALVE-OPERATING GEAR FOR STEAM-ENGINES.

1,009,652.

Specification of Letters Patent. Patented Nov. 21, 1911.

Application filed July 8, 1911. Serial No. 637,536.

*To all whom it may concern:*

Be it known that I, GEORGE DIXON, a subject of the King of Great Britain and Ireland, residing at Soho Iron Works, Bolton, in the county of Lancaster, England, have invented Improvements in or Relating to Valve-Operating Gear for Steam-Engines, of which the following is a specification.

This invention relates to steam engines in which the valves are operated and controlled with the aid of auxiliary power cylinders and pistons, the supply of motive fluid to the latter cylinders being itself controlled by a speed governor.

The object of the present invention is to provide improved constructions and arrangements of parts as hereinafter fully described, important features being the provision of steam dash pots adapted to secure a very efficient cushioning effect upon the actuating piston and connected parts, capable in some cases of a minute adjustment; the inclosing of moving parts so as to avoid the use of stuffing boxes; and the supplying of the auxiliary power cylinders with steam derived from the dash-pot.

In the accompanying drawings Fig. 2 is a view to a larger scale of a modified construction of dash pot and Fig. 3 is a plan of a part of Fig. 2, removed from the latter. Fig. 4 is a front elevation and Fig. 5 a half end elevation of an engine cylinder fitted with a gear for Corliss valves. Fig. 20 is a sectional elevation of a further modification.

Figure 1:
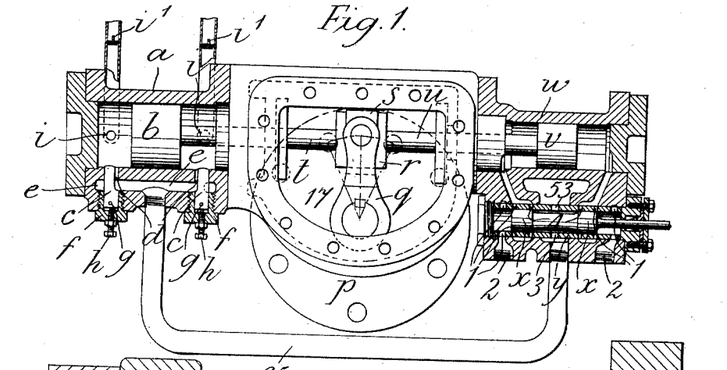
Figure 1 is a more or less diagrammatic view, partly in section, of a valve and dash pot arrangement embodying the invention.

In Fig. 1 $a$ is the dash pot cylinder, $b$ the dash pot piston, $c$ plugs with parts cut away to form leakage passages $d$ communicating with the steam exhaust space $e$, $f$ bearing bushes for the plugs $c$, $g$ screws for preventing rotation of the latter and $h$ screws for adjusting their position axially. $i$ represent steam inlet ports which are fitted with non-return valves $i^1$. Steam is admitted to the dash pot cylinder $a$ through the retaining or non-return valves $i^1$ and is exhausted by the leakage passages $d$ in the plugs $c$. If the plugs are adjusted to closely approach the piston $b$ then the piston when it moves over sufficiently far to cover a leakage passage will practically close it, but if the plugs be retracted somewhat, then the leakage may take place to a certain extent even after the position occupied by a leakage hole is passed by the piston on its covering stroke.

Figure 2:
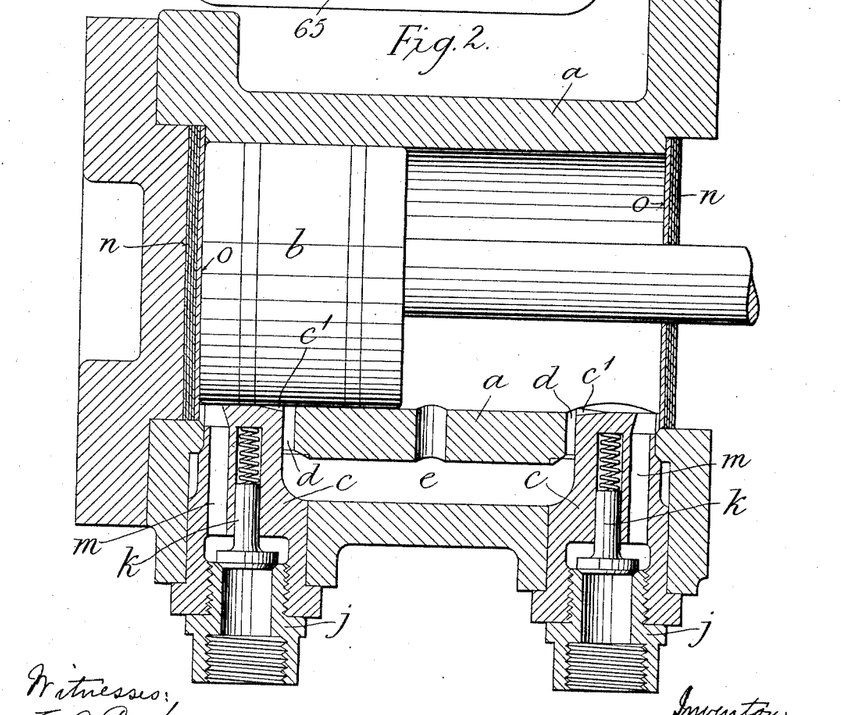

In the modified form of dash pot shown in Fig. 2 the plugs $c$ are not intended to be adjusted axially, it being found that the beveled face $c^1$ alone enables the required cushioning effect to be secured. $j$ are hollow nipples formed with seats for spring loaded valves $k$ which serve to control admission of steam to the cylinder $a$ by way of passages $m$. $n$ represent thin disks of metal at the ends of the cylinder, separated from the piston by thicker disks $o$ which it is found have an important influence in preventing "slam" as the piston reaches the end of its stroke.

Assuming that it is desired to apply the invention to a Corliss valve operating gear then as shown in Fig. 1 the vlave spindle $p$ may be provided with a lever $q$ that is forked, its arms engaging dies $q^1$ sliding in grooves in opposite sides of a block $q^2$ fixed to the piston rod comprising two parts $t$, $u$, one $t$ leading to the piston $b$ of the cushioning cylinder $a$ located at one side of the valve and the other $u$ leading to the piston $v$ of an actuating cylinder $w$, preferably of smaller diameter, located at the opposite side of the valve. The valve for admitting steam to and exhausting steam from the actuating cylinder $w$ is preferably of the balanced piston type and may comprise two short pistons $x$ working in a liner $y$ having at each end a set of ports 1, each of which serves to establish communication with an exhaust passage 2 while another set 3 serves to establish communication with a steam chest 5 through other ports 4 in the liner intermediate of the sets of ports referred to.

Figures 3, 4, 5:
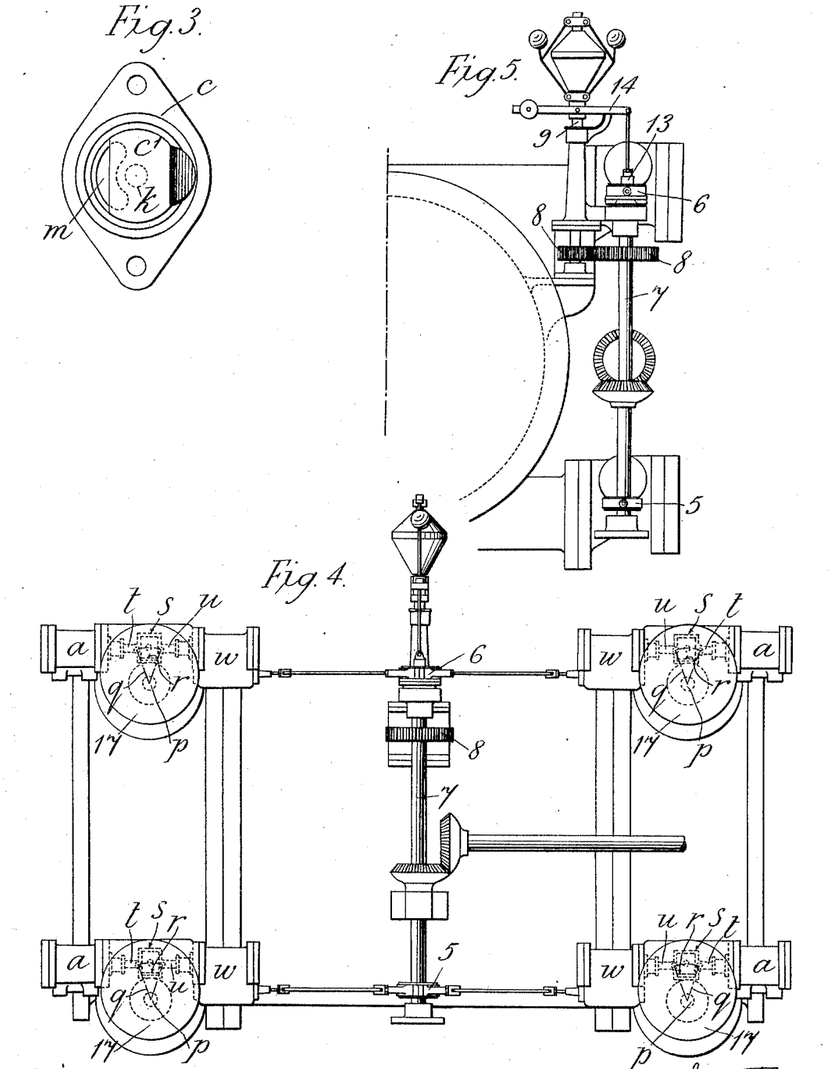
Figures 6, 7, 8:
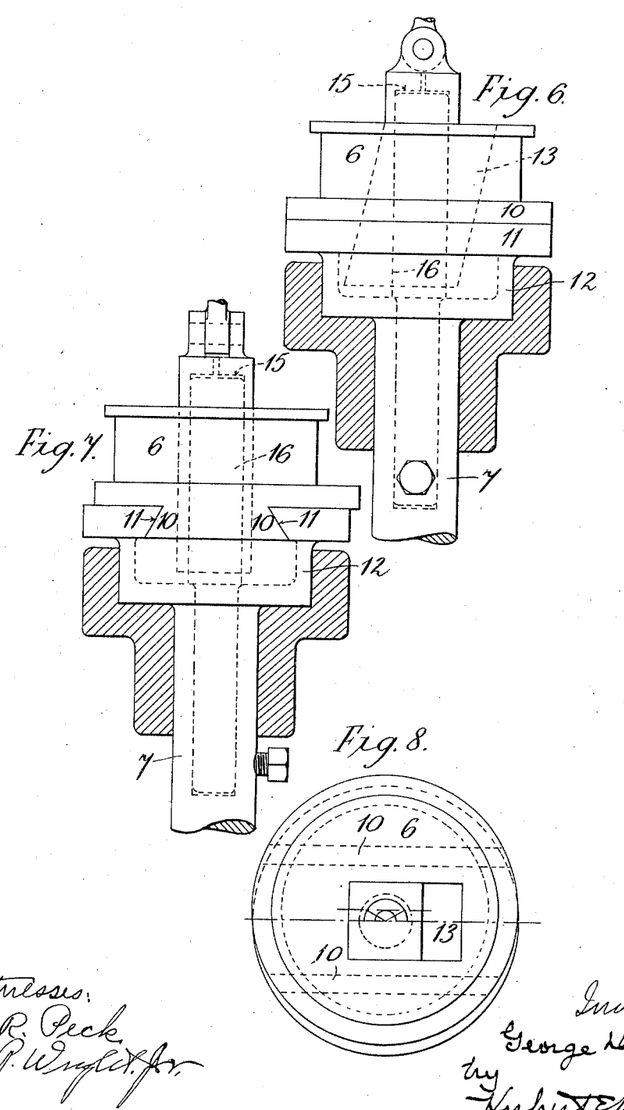
Figs. 6, 7 and 8 are respectively a sectional side elevation, front elevation and plan to a larger scale of one of the eccentrics of the gear shown in Figs. 4 and 5.

In Figs. 4 and 5 an engine cylinder is shown having at the top two steam admission valves and at the bottom two exhaust valves, each valve having its lever $q$ connected to a combined dash pot and actuating cylinder as already described, the connection of the lever $q$ to the rod $t\ u$ being however shown as effected through a stirrup $s$ upon the latter within which slides a die $r$ secured to the lever $q$. The operation of the slide valves of the actuating cylinders $w$ may be effected by eccentrics 5, 6 upon a single shaft 7 driven in any suitable way from the main crank shaft, one eccentric 5, for controlling the actuating cylinders $w$ pertaining to the exhaust valves of the Corliss gear, being fixed, the other eccentric 6, for controlling the actuating cylinders $w$ pertaining to the admission valves, being movable. The actuating and cushioning cylinders $w$, $a$ of the two admission valves may be in line above the valves, and those of the exhaust valves similarly arranged relatively thereto, the eccentric shaft 7 being arranged intermediate of the sets of valves for the respective ends of the engine cylinder and geared as by the wheels 8 to the governor spindle 9. Conveniently the movable eccentric 6 may as shown in Figs. 6, 7 and 8, be formed with an undercut slide 10 so that it can traverse a slideway 11 provided upon a boss 12 of the eccentric shaft 7, and it may be moved by means of a block 13 having inclined faces that engage corresponding faces in the eccentric. This block 13 passes right through the eccentric 6 and is capable of being moved by the governor through a counterbalanced lever 14 (Fig. 5) in the direction of the axis of the eccentric shaft without however being capable of rotation relatively thereto, 15 being a recess in the block 13 sliding over a guide pin 16 carried by the boss 12 referred to.

Each Corliss valve spindle $p$ and the means connecting same to the actuating and cushioning cylinders may be confined in a bonnet 17 (Figs. 1 and 4) by which means packing of the valve spindle may be dispensed with and leakage trouble overcome.

Figures 9, 12:
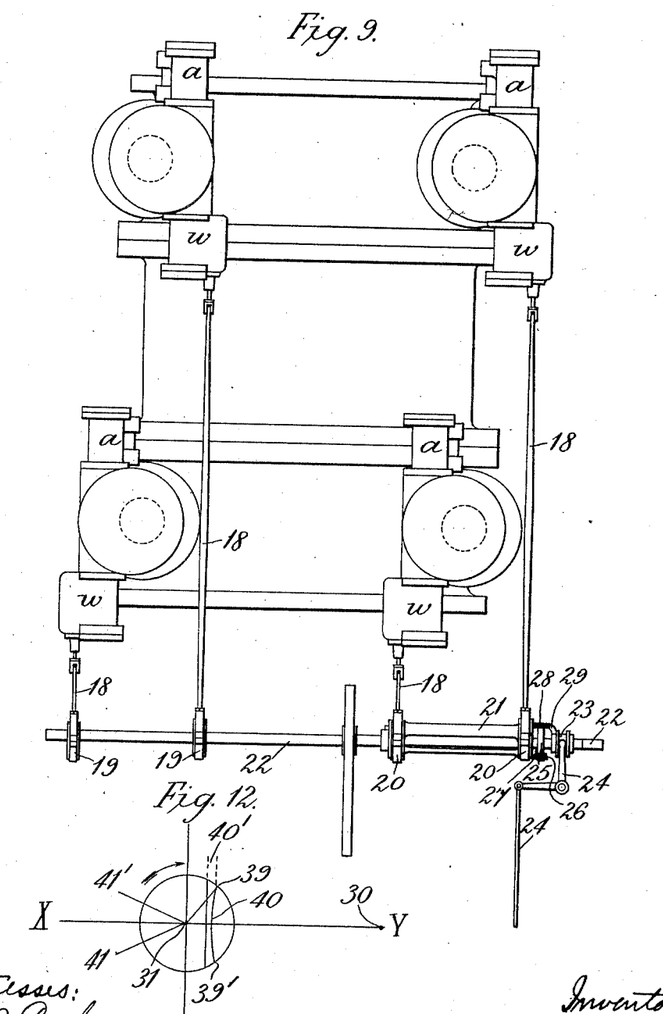
Fig. 9 is a view similar to Fig. 4 of a modified form of gear for an engine of short stroke.
Fig. 12 is a diagram illustrating a modification necessary in using the eccentric of Figs. 10 and 11 in a reversing engine.

In the case of an engine with a cylinder of short stroke, or say a vertical engine, as shown in Fig. 9, the actuating and cushioning cylinders $w$ $a$ of the engine admission and exhaust valves may be out of line; for example those at the top of the engine cylinder may be at one side of the engine cylinder valves and those at the other end on the opposite side. The eccentric rod 18 for the control valve of each actuating cylinder $w$ may each be connected to a separate eccentric 19, 19 and 20, 20 on a single shaft 22 located near one end of the engine cylinder. The eccentrics 20, 20 for the valves of the actuating cylinders pertaining to the engine admission valves may be mounted upon a sleeve 21 that can be angularly displaced about the eccentric shaft 22 in accordance with axial movement of a grooved sleeve 23 connected to the governor through the connections 24. The movement of the sleeve 23 may produce rotation of the eccentric sleeve 21 through a short transverse spindle 25 having a bevel wheel 26 at one end engaging a toothed segment 27 upon the eccentric sleeve and having at the other end a spur wheel 28 engaging a rack 29 carried by the sliding sleeve 23.

Figure 10:
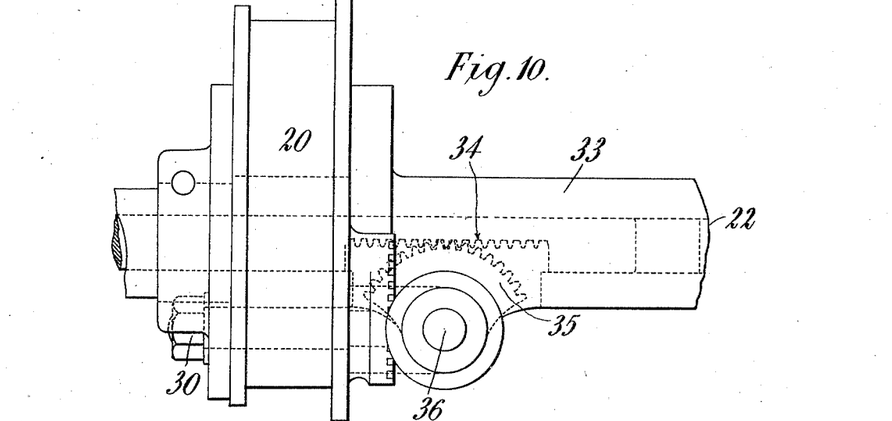
Figs. 10 and 11 show in front and side elevation one of the eccentrics of the gear of Fig. 9.
Figure 11:
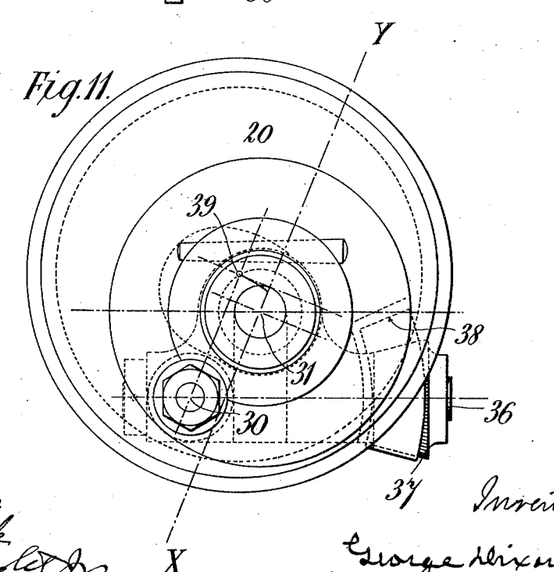

According to the modification shown in Figs. 10 and 11 respectively the movable eccentric 20 has a pivotal axis 30 parallel to the axis 31 of the eccentric shaft, the requisite angular displacement being obtained by longitudinal movement of a governor controlled spindle 32 within the hollow part 33 of the shaft 22, the said spindle 32 having a rack 34 that engages a toothed segment 35 upon a tangential spindle 36 the other end whereof carries a bevel wheel 37 engaging a curved rack 38 on the eccentric struck with the center 39 about which the latter can turn. The pivotal point 30 of the eccentric is such that with a given lead it and the center 39 of the eccentric lie in a line parallel to, or approximately parallel to, the axis X Y of the valve $x$ and so that when the eccentric is moved to its other extreme position the center 39 of the eccentric lies in the axis of the valve beyond the center 31 of the shaft and removes the lead. In the case of a reversing engine the eccentric arrangement will be modified in comparison with the arrangement just referred to, so that as indicated in diagram Fig. 12 when the eccentric is moved from one extreme position to the other its center 39 passes from one side of the axis X Y of the valve to say a point $39^1$ at the other side along a curved path 40 that falls between the axis 31 of the eccentric shaft and the pivotal point 30 of the eccentric, the curvature of the said path preventing the valve from obtaining too much lead in the intermediate positions of the eccentric. A fraction of a second elapses before the piston of the actuating cylinder $w$ moves after the slide valve $x$ is open to lead, and to allow for this the engine crank is caused to occupy a position coinciding somewhat with line 31—41 assuming the direction of rotation to be that indicated by the arrow. With reversal in direction of rotation the eccentric will be shifted, by any suitable means, so that the crank occupies some such position as that indicated by the line 31—41¹. 40¹ represents the amount of the lead at full stroke, the reduction of this as the eccentric is moved to secure earlier cut off being regulated by the position of the center 30 with respect to the center 39.

Figure 13:
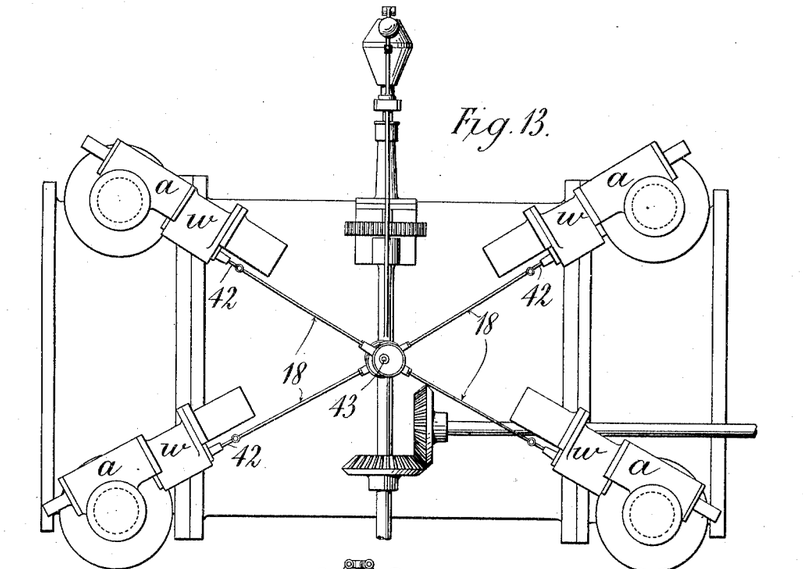
Figs. 13 and 14 are views similar to Figs. 4 and 5 of a further modified form of gear, for Corliss valves.
Figure 14:
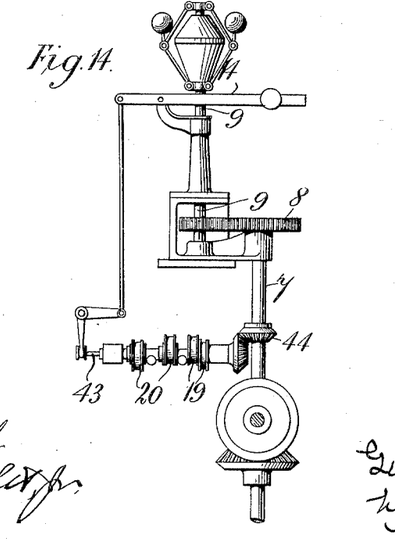

In another arrangement shown in Figs. 13 and 14, the actuating and cushioning cylinders $w$, $a$ of the upper admission valve at each end of the engine cylinder are in line with those of the exhaust valve at the other end of the engine cylinder, being inclined to each other so that the actuating or controlling valve spindles 42 and eccentric rods 18 extend diagonally; the eccentrics 19, 20 are mounted on a shaft 43 arranged radially to the axis of the engine cylinder and driven through bevel gear 44 from the shaft that is geared to the governor spindle 9, the admission valve eccentrics 20 being moved through balanced bell crank connections with the governor and means such as hereinbefore described with reference to Figs. 4 to 8.

Figure 15:
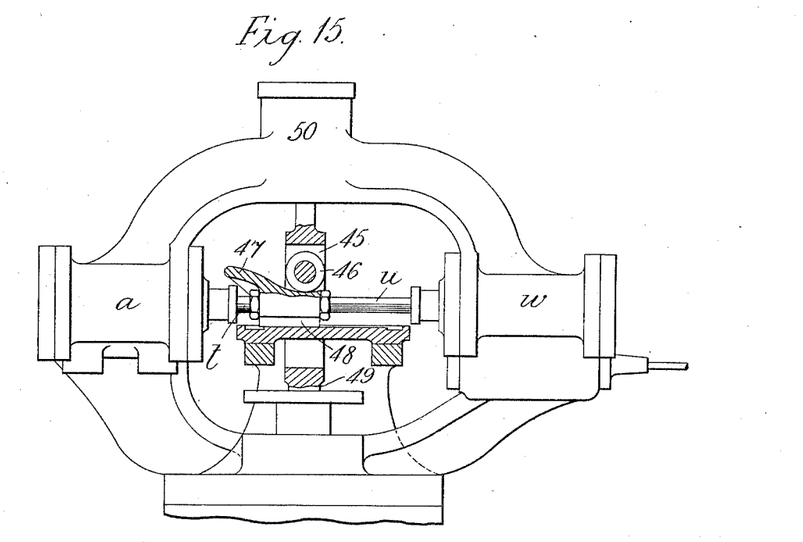
Fig. 15 is a part sectional side elevation of a drop valve embodying the invention.
Figure 16:
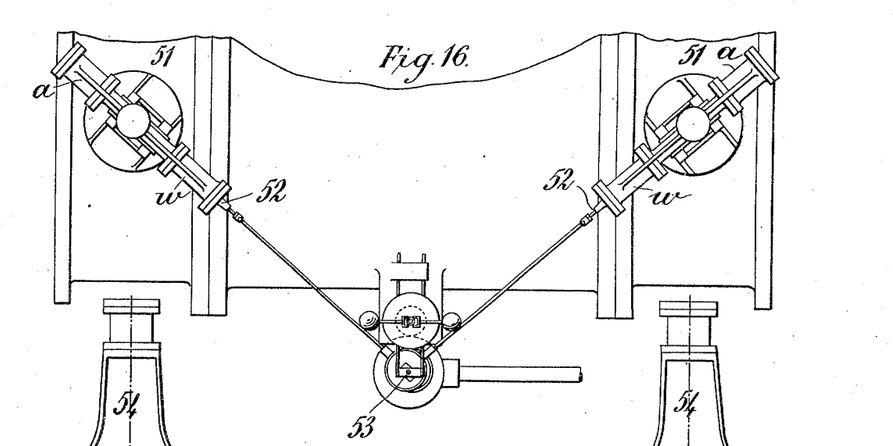
Fig. 16 is a plan of a cylinder fitted with two such drop valves.

In an engine having drop valves or other valves with straight line movements each valve spindle may as shown in Fig. 15 be formed with a stirrup 45 carrying an anti-friction roller 46 adapted to bear upon a curved actuating block 47 carried by a cross head 48 upon the rods $t$, $u$ of cushioning and actuating cylinders $a$ $w$ which are disposed at right angles to the valve spindle 49. The surface of the block 47 is curved to permit the valve to close gently, and, if desired, the valve stem 49 may extend into a cushioning cylinder or box 50 which will act only when the valve approaches its innermost position and the roller is just clear of the curved block. Assuming, as shown in Fig. 16, the engine to have a cylinder with drop steam valves at 51 diametrically arranged in relation to Corliss exhaust valves at the opposite side, the actuating and cushioning cylinders $w$, $a$ may be arranged so that the piston rods 52 of the actuating cylinders pertaining to the two admission valves at 51 converge toward a transverse eccentric shaft 53 connected with governor gear as in the cases already described, while the piston rods of the actuating cylinders pertaining to the exhaust valves at the other side of the cylinder similarly converge toward the said shaft.

Figure 17:
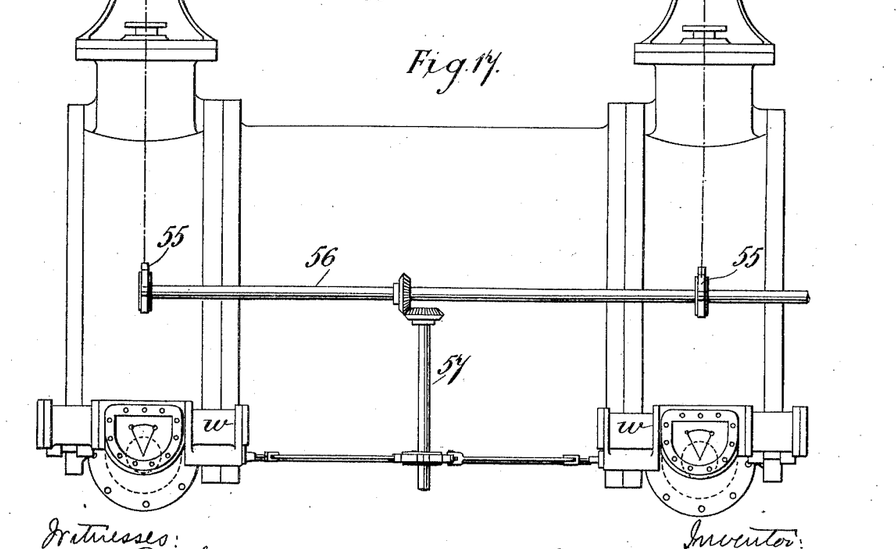
Fig. 17 is a side elevation and Fig. 18 an end view of a cylinder fitted with ordinary drop admission valves and with Corliss exhaust valves the latter fitted with gear according to the invention.
Figures 18, 20:
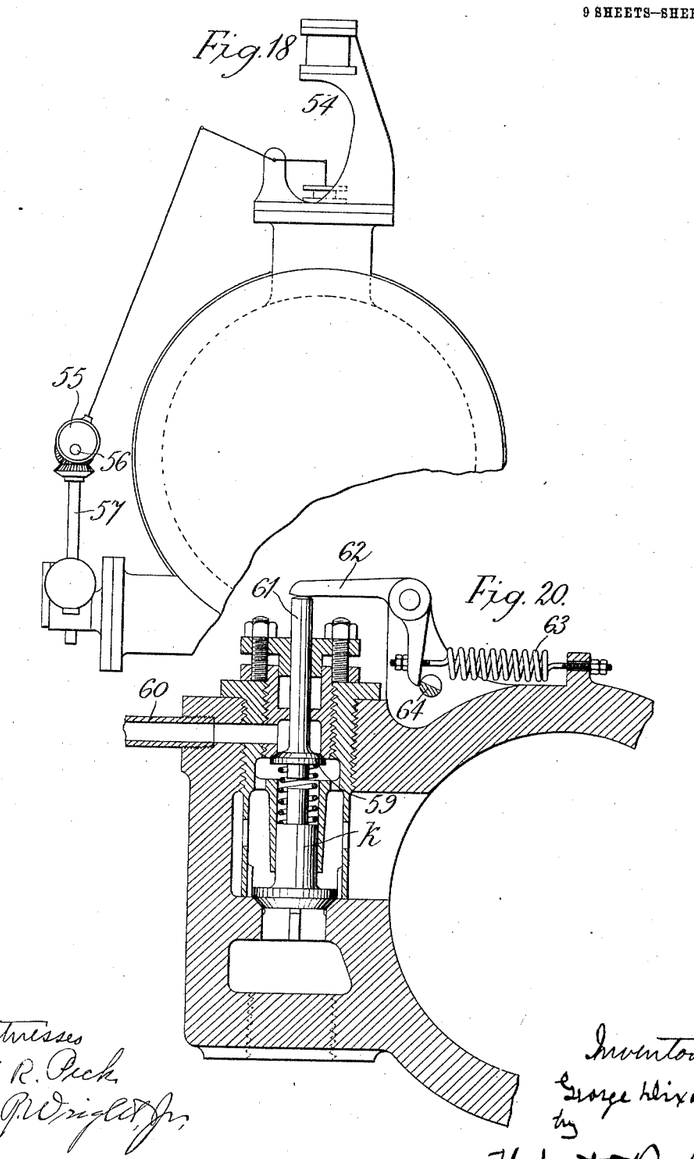

Fig. 17 is a side elevation and Fig. 18 an end elevation of another engine cylinder having Corliss exhaust valves and gear arranged substantially as in Fig. 4 and drop valves at 54 of ordinary type but operated by eccentrics 55 from a shaft 56 geared to the eccentric shaft 57 that controls the valves of actuating cylinders $w$ according to this invention.

Figure 19:
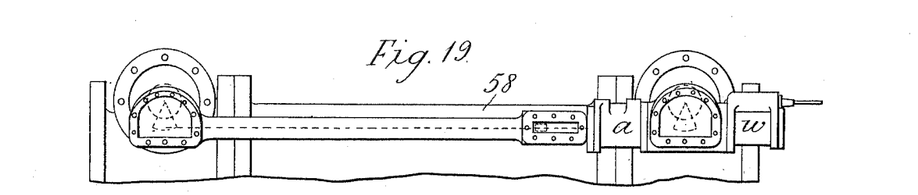
Fig. 19 is a view of a pair of directly coupled exhaust valves connected to gear according to the invention.

In some cases one actuating and one dash pot cylinder may be employed to operate a pair of engine valves, the said cylinders with their connections being inclosed by a bonnet arrangement as aforesaid and other appropriate casing to avoid stuffing boxes. An example is shown in Fig. 19 where the actuating cylinder $w$ and dash pot cylinder $a$ are disposed at opposite sides of one of a pair of exhaust valves illustrated as coupled together, 58 being a casing adapted to inclose connections leading from the spindle $p$ of one valve to the piston $t$ of the dash pot.

As a safeguard against overrunning of the engine, one of the retaining or non-return admission valves of the cushioning cylinder $a$ can be connected to the governor so that on the latter rising to its highest position the valve is prevented from supplying steam to that end of the cushioning cylinder while at the same time another valve is opened connecting it with the exhaust of the actuating cylinder $w$. An arrangement of this character is shown in Fig. 20 where $k$ represents one of the spring loaded valves of a dash pot such as shown in Fig. 2 with which is associated a valve 59 controlling the inlet to a pipe 60 which may extend to the exhaust chamber of the actuating cylinder. The stem 61 of this valve 59 is arranged to be acted upon by one arm of a bell crank lever 62 through the agency of a spring 63 when a hand-set pin 64 is sufficiently rotated by the governor to release the other arm of the lever 62. The valve $k$ chosen is that at the end occupied by the piston $b$ when the Corliss or other valve is closed. The valve 59 when opened places an extra load on the valve $k$ and prevents it opening, any steam pressure at that end of the dash pot being relieved by way of the pipe 60. Under these conditions although steam may still be supplied to the actuating cylinder $w$ the pressure at the non-corresponding end of the dash pot will prevent the piston $v$ in the actuating cylinder $w$ leaving the end at which it is left, as the dash pot piston $b$ has the larger area.

In all cases the steam for the actuating cylinder $w$ may be derived from the dash pot cylinder, as for instance by a connection 65 between the exhaust space $e$ and the steam chest 5 in Fig. 1.

What I claim is:—

1. Valve operating gear comprising an actuating cylinder, a dash pot cylinder, a piston in each such cylinder, said pistons being operatively connected together and to a valve moving element, a steam inlet and companion leakage passage at each end of the dash pot cylinder, a retaining valve in each such inlet and means operated independently of the pistons for alternately supplying steam to and exhausting it from each end of the actuating cylinder.

2. Valve operating gear comprising an actuating cylinder, a dash pot cylinder, a piston in each such cylinder, said pistons being operatively connected together and to a valve moving element, a steam inlet at each end of the dash pot cylinder, a retaining valve in each such inlet a plug corresponding to each inlet having a leakage passage therein, a steam exhaust space with which the leakage passages communicate, and means for alternately supplying steam to and exhausting it from each end of the actuating cylinder.

3. Valve operating gear comprising an actuating cylinder, a dash pot cylinder, a distributing valve adapted to admit steam to and exhaust it from the actuating cylinder, inlet passages adapted to admit steam to the dash pot cylinder, leakage passages adapted to permit it to exhaust from the said cylinder, and means conducting the exhaust steam from the dash pot cylinder to the distributing valve controlling steam admission to the actuating cylinder.

4. Valve operating gear comprising an actuating cylinder a dash pot cylinder, a piston in each such cylinder, said pistons being operatively connected together and to a valve moving element, and a casing making a fluid tight joint with both cylinders and adapted to inclose the connecting means and valve moving element aforesaid.

5. Valve operating gear comprising an actuating cylinder a dash pot cylinder, a piston in each such cylinder, said pistons being operatively connected together and to a valve moving element, a casing making a fluid tight joint with both cylinders and adapted to inclose the connecting means and valve moving element aforesaid, a steam inlet at each end of the dash pot cylinder, a retaining valve associated with each such inlet and means for alternately supplying steam to and exhausting it from each end of the actuating cylinder.

6. Valve operating gear comprising an actuating cylinder a dash pot cylinder, a piston in each such cylinder, said pistons being operatively connected together and to a valve moving element, a casing making a fluid tight joint with both cylinders and adapted to inclose the connecting means and valve moving element aforesaid, a steam inlet at each end of the dash pot cylinder, a retaining valve associated with each such inlet a plug corresponding to each inlet having a leakage passage therein, a steam exhaust space with which the leakage passages communicate, and means for alternately supplying steam to and exhausting it from each end of the actuating cylinder.

7. Valve operating gear comprising an actuating cylinder, a dash pot cylinder, a piston in each such cylinder, said pistons being operatively connected together and to a valve moving element, a casing making a fluid tight joint with both cylinders and adapted to inclose the connecting means and valve moving element aforesaid, means for admitting steam to the dash pot cylinder, means for permitting it to exhaust from the said cylinder and means for alternately supplying steam to and exhausting it from each end of the actuating cylinder.

8. Valve operating gear comprising an actuating cylinder, a dash pot cylinder, a piston in each such cylinder, said pistons being operatively connected together and to a valve moving element, a casing making a fluid tight joint with both cylinders and adapted to inclose the connecting means and valve moving element aforesaid, means for admitting steam to the dash pot cylinder, means for permitting it to exhaust from the said cylinder, a steam space in communication with the last named means, means for alternately supplying steam to and exhausting it from each end of the actuating cylinder and means conducting the exhaust steam from the dash pot cylinder to the means controlling steam admission to the actuating cylinder.

9. Valve operating gear comprising an actuating cylinder, a dash pot cylinder, a piston in each such cylinder, said pistons being operatively connected together and to a valve moving element, a casing making a fluid tight joint with both cylinders and adapted to inclose the connecting means and valve moving element aforesaid, a steam inlet at each end of the dash pot cylinder, a retaining valve associated with each such inlet, a plug corresponding to each inlet having a leakage passage therein, a steam exhaust space with which the leakage passages communicate, means for alternately supplying steam to and exhausting it from each end of the actuating cylinder and means for conducting the exhaust steam from the dash pot cylinder to the means controlling steam admission to the actuating cylinder.

10. Valve operating gear comprising a valve moving element, a steam actuating cylinder disposed at one side of said element, a steam dash pot cylinder disposed at the opposite side thereof, a piston in each such cylinder, said pistons being operatively connected together and to the said element, a bonnet making a fluid tight joint with both cylinders and inclosing the piston connecting means and valve moving element aforesaid, a steam distributing valve controlling admission of steam to and its exhaust from the actuating cylinder, and means embodying a movable eccentric for modifying the operation of the steam distributing valve to agree with alteration in running conditions.

11. Valve operating gear comprising a valve moving element, a steam actuating cylinder disposed at one side of said element, a steam dash pot cylinder disposed at the opposite side thereof, a piston in each such cylinder, said pistons being operatively connected together and to the said element, a bonnet making a fluid tight joint with both cylinders and inclosing the piston connecting means and valve moving element aforesaid, a steam distributing valve controlling admission of steam to and its exhaust from the actuating cylinder, means for admitting steam to the dash pot cylinder, means permitting it to exhaust therefrom, means for conducting said exhaust steam from the dash pot cylinder to the distributing valve of the actuating cylinder, and means embodying a movable eccentric for modifying the operation of the steam distributing valve to agree with alteration in running conditions.

12. In valve operating gear of the kind described, a dash pot cylinder, a hollow plug at each end of such cylinder extending laterally therethrough and constituting a steam inlet and a non-return valve disposed within each plug aforesaid.

13. In valve operating gear of the kind described a dash pot cylinder, a hollow plug at each end of such cylinder extending laterally therethrough constituting a steam inlet and having a cut away part constituting a leakage passage that forms a continuation of a beveled end face and a non-return valve disposed within each plug aforesaid.

14. In valve operating gear of the kind described, a dash pot cylinder, a hollow plug at each end of such cylinder extending laterally therethrough constituting a steam inlet and having a cut away part constituting a leakage passage that forms a continuation of a beveled end face a non-return valve disposed within each plug aforesaid and anti-slam disks at each end of the cylinder.

15. In valve operating gear, the combination with a steam dash pot cylinder, of a hollow plug adapted to establish communication between one end of the cylinder and a steam inlet, an inlet valve disposed within the plug and adapted to interrupt said communication, a pipe associated with one end of the hollow plug, and adapted to establish communication between the said end of the cylinder and an exhaust space, an exhaust valve adapted to interrupt said communication, a spring disposed between both valves tending to keep each closed, a spring-pressed lever adapted to open the exhaust valve and in so doing increase the load on the inlet valve and a hand set tripping pin adapted with an overload on the engine to be removed by the governor to release the said spring-pressed lever.

16. Valve operating gear comprising a pair of Corliss steam inlet valves, a lever connected to each valve, a dash pot cylinder disposed between both levers a piston in said dash pot cylinder operatively connected to said levers, an actuating cylinder disposed at the opposite side of one of the levers, a piston in the actuating cylinder connected to such lever, a bonnet in liquid tight connection with both cylinders adapted to inclose the lever and connections therebetween, and a bonnet having a casing in liquid tight connection with the dash-pot cylinder adapted to inclose the remaining lever and connections leading to the dash-pot piston.

Signed at Manchester, England, this twenty-third day of June 1911.

GEORGE DIXON.

Witnesses:
ERNOLD SIMPSON MOSELEY,
MALCOLM SMETHURST.

Copies of this patent may be obtained for five cents each, by addressing the "Commissioner of Patents, Washington, D. C."